United States Patent Office 3,282,986
Patented Nov. 1, 1966

3,282,986
N-ACYLATED HYDROXAMIC ACIDS AND
DERIVATIVES THEREOF
Edward A. Kaczka, Union, N.J., assignor to Merck & Co.,
Inc., Rahway, N.J., a corporation of New Jersey
No Drawing. Filed Oct. 6, 1960, Ser. No. 60,813
The portion of the term of the patent subsequent to
Aug. 24, 1982, has been disclaimed
4 Claims. (Cl. 260—471)

This invention relates to N-substituted hydroxamic acids and salts thereof.

The hydroxamic acids of my invention may be aliphatic hydroxamic acids such as N-substituted formohydroxamic acids and acetohydroxamic acids or may be aromatic hydroxamic acids such as N-substituted benzhydroxamic acids.

The compounds of this invention have the general structure:

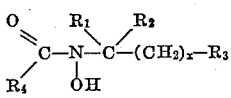

where $R_1$ and $R_2$ can be hydrogen or/and an alkyl group such as methyl, ethyl, propyl, butyl, pentyl, heptyl, decyl, dodecyl; an aryl group, such as phenyl; and substituted aryl groups such as p-propylphenyl, o-chlorophenyl, p-chlorophenyl, o-nitrophenyl, p-nitrophenyl, p-hydroxyphenyl. $R_3$ can be carboxy, carboalkoxy, carboxamido and cyano. $R_4$ can be either hydrogen or alkyl groups such as methyl, ethyl, propyl, butyl or substituted alkyl groups such as chloromethyl and dichloromethyl; and $x$ is an integer from 0 up to 10. When both $R_1$ and $R_2$ are hydrogen, $x$ is an integer greater than 0 and less than 11. When $R_1$ and/or $R_2$ are not hydrogen, $x$ may be equal to 0. $R_1$ and $R_2$ may be a part of a carbocyclic ring such as cyclohexane or cyclopentane.

Typical compounds of my invention are the following:

Sodium N-formyl β-hydroxyamino-β-phenylpropionate,
Sodium N-formyl α-hydroxyamino-β-phenylpropionate,
Sodium N-formyl β-hydroxamino-β-(o-chlorophenyl)-propionate,
Sodium N-formyl β-hydroxyamino-β-(p-nitrophenyl)-propionate,
Potassium N-acetyl β-acetyl β-hydroxyamino-β-(p-nitrophenyl)-propionate,
Sodium N-formyl 1-hydroxyaminocyclohexane-1-carboxylate,
N-formyl 1-hydroxyaminocyclohexane-1-carboxylic acid,
Potassium N-formyl β-hydroxyamino-β-(p-isopropylphenyl)-propionate,
Sodium N-formyl β-hydroxyamino-β-(p-isopropylphenyl)-propionate,
Sodium N-formyl 1-hydroxyaminocyclopentane-1-carboxylate,
Calcium N-butyryl 1-hydroxyaminocyclopentane-1-carboxylate,
Ammonium N-formyl 1-hydroxyaminocyclopentane-1-carboxylate,
Sodium N-formyl β-hydroxamine-β-(p-hydroxyphenyl)-propionate,
Potassium N-acetyl α-hydroxyaminohendecanoamide,
N-formyl α-hydroxyaminoisovaleramide,
N-formyl α-hydroxyaminoisovaleronitrile.

The above substances are useful in the preparation of chelates of such metals as iron and copper. Chelating agents are useful in removing metallic impurities from liquids. The above substances will also form salts with organic bases such as pyridine, pyrimidine indole. Several of the above substances are also useful for substantially inhibiting the growth of certain plants or for killing certain plants and, in particular, crab grass and broadleaf weeds, without permanently damaging lawn grass and certain other plants.

It is, therefore, an object of this invention to provide N-substituted hydroxamic acids and salts thereof.

Another object of this invention is to provide a process for making N-substituted hydroxamic acids and salts thereof.

Further objects will be apparent from the detailed disclosure provided herein:

In accordance with my invention, I have found that hydroxyamino carboxylic acids and derivatives such as esters and amides are readily converted to N-substituted hydroxamic acids and derivatives of N-substituted hydroxamic acids such as amides and esters.

The compounds of my invention may be prepared by acylation of hydroxyamino acids and derivatives such as esters and amides as shown in the following reaction:

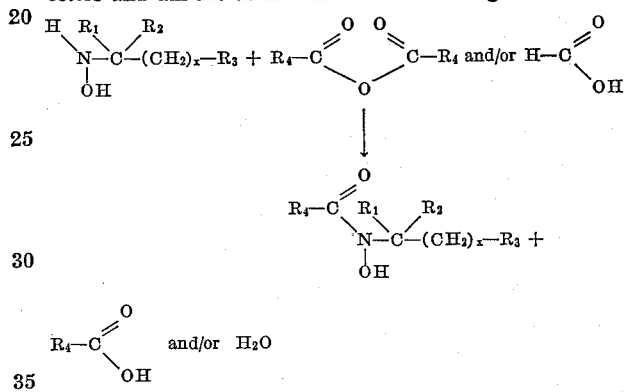

wherein $R_1$ and $R_2$ can be hydrogen or/and an alkyl group such as methyl, ethyl, propyl, butyl, pentyl, heptyl, decyl and dodecyl; and an aryl group such as phenyl; and substituted aryl such as p-propylphenyl, o-chlorophenyl, p-chlorophenyl, o-nitrophenyl, p-nitrophenyl and p-hydroxyphenyl, $R_3$ can be carboxy, carboalkoxy, carboxamido and cyano. $R_4$ can be either hydrogen, an alkyl group such as methyl, ethyl, propyl, butyl, or a substituted alkyl group such as chloromethyl and dichloromethyl; and $x$ is an integer from 0 up to 10. When both $R_1$ and $R_2$ are hydrogen, $x$ is an integer greater than 0 and less than 11. When $R_1$ and/or $R_2$ are not hydrogen, $x$ may be equal to 0. $R_1$ and $R_2$ may be a part of a carbocyclic ring such as cyclohexane or cyclopentane.

Preferably, the acylation should take place at a temperature between 0° and 50° C. The time of reaction at a temperature of ca. 40° C. to 50° C. is preferably less than one hour. At lower temperatures, such as about 25° C., the reaction may be run for a period of as much as fifteen hours. When the reaction is run for such a long time, diacylation may take place, and water must be added to the reaction mass to hydrolize the resulting O,N diacyl compound to obtain the N-acyl compounds. Examples of suitable acylating compositions include (i) formic acid, (ii) mixtures of formic acid and acetic anhydride wherein there is an excess of formic acid in relation to acetic anhydride, (iii) acetic anhydride, (iv) propionic anhydride, (v) aceticpropionic mixed anhydride, (vi) benzoyl chloride and (vii) phenacetyl chloride. Where formic acid is included in the acylation mixture, N-formylation of the hydroxylamine will take place. Examples of N-substituted hydroxylamines which may be acylated include:

β-hydroxyamino-β-phenylpropionic acid.
α-hydroxyamino-β-phenylpropionic acid.
β-hydroxyamino-β-(o-chlorophenyl) propionic acid.

β-hydroxyamino-β-(p-nitrophenyl) propionic acid.
1-hydroxyaminocyclopentane-1-carboxylic acid.
β-hydroxyamino-β-(p-isopropylphenyl) propionic acid.
β-hydroxyamino-β-(p-hydroxyphenyl) propionic acid.
α-hydroxyaminoisovaleramide.
α-hydroxyaminoisovaleronitrile.

The acylation agent should be present in an excess quantity relative to the hydroxyamino acid. A molar ratio of acylation agent to hydroxyamino acid in the range of about 5:1 up to 20:1 is preferred. The N-substituted hydroxamic acid thus formed is then separated from the reaction solution usually by evaporating the reaction solution to dryness under reduced pressure. Thus, a residue of the crude product remains. The residue so formed may be further purified by recrystallization from a suitable solvent. Alternatively, the free acid may be converted to an alkali metal salt by solution in water and addition of an approximate amount of such compounds as NaOH, CaCO₃ and KOH. The alkali metal salt may be crystallized from water by the addition of acetone or, in some cases, ethanol.

The following examples are given for purposes of illustration and not by way of limitation:

EXAMPLE 1

*Sodium N-formyl β-hydroxyamino-β-phenylpropionate*

471 milligrams of β-hydroxylamino-β-phenylpropionic acid is added to 7 milliliters of 98 percent formic acid and 1 milliliter of acetic anhydride. The resulting solution gives a strong positive FeCl₃ test.

The solution is allowed to stand for 2.5 hours at about 25° C. The solution is then evaporated to dryness in vacuo at a temperature of about 25° C. 7 milliliters of water are then added to the residue, and a dilute solution of sodium hydroxide is added to bring the pH of the solution to between 6 and 7. To the solution 40 ml. of ethanol is added. After evaporating the solution under reduced pressure, the residue thereby obtained is washed with ethanol. The ethanol solution is then separated from the washed residue. The resulting residue is dried and then dissolved in 5 milliliters of water. To the resulting solution, 5 volumes of acetone are added, thus causing the crystalline, sodium N-formyl β-hydroxyamino-β-phenylpropionate, having the structural formula:

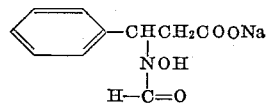

to precipitate at a temperature of 205–210° C.

EXAMPLE 2

*Sodium N-formyl 1-hydroxyaminocyclopentane-1-carboxylate*

523 milligrams of the ammonium salt of 1-hydroxyaminocyclopentane-1-carboxylic acid having the structure:

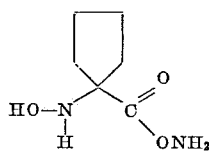

are dissolved in approximately 10 milliliters of 98 percent formic acid. 1 milliliter of acetic anhydride is added. To a small portion of the reaction mass a 1 percent aqueous solution of FeCl₃ is added, whereupon a strong purple-red color appears, thus showing the presence of a hydroxamic acid. The entire reaction mass is stirred for 10 minutes at a temperature of 25° C. The resulting solution is then evaporated under reduced pressure to a thick, clear syrup. To this syrup approximately 3 milliliters of water is added, and a solution is thus formed. To the resulting solution, a dilute solution of sodium hydroxide is added, and the pH of said solution is adjusted to a range of 7–8. During this pH adjustment, crystals precipitate from the solution. To the resulting slurry approximately 35 milliliters of ethanol are added, the addition taking place with constant agitation. The resulting slurry is then centrifuged, and the crystals are separated from the supernatant liquid. The crystals are then washed with ethanol and dried. The dried crystals are then dissolved in approximately 7 milliliters of water. About 30 milliliters of ethanol are added to the resulting solution causing crystalline sodium N-formyl 1-hydroxyaminocyclopentane-1-carboxylate to precipitate. These crystals are separated from the mother liquor by means of centrifugation and dried. The compound has the following structure:

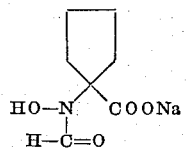

These crystals darken at a temperature of about 225° C. and melt with decomposition at about 250° C.

EXAMPLE 3

*N-formyl-α-hydroxyaminosovaleramide*

To 400 mg. of α-hydroxyaminosolvaleramide having the structure:

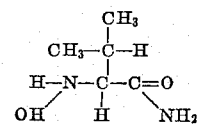

5 ml. of 98 percent formic acid and 0.5 milliliter of acetic anhydride are added. The resulting reaction mass is maintained with agitation at 25° C. for one hour. The resulting solution is then evaporated to dryness under reduced pressure. The resulting residue is triturated with diethyl ether. The residue, on standing under the diethyl ether, crystallizes. The resulting slurry is filtered, and the precipitate obtained from the filtration is recrystallized from methyl alcohol to give N-formyl-α-hydroxyaminosovaleramide. The structure of this compound is as follows:

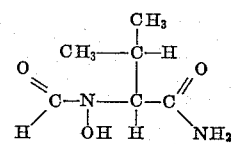

The melting point of the above-mentioned compound is 156–158° C.

EXAMPLE 4

*N-formyl-α-hydroxyaminosovaleronitrile*

To 400 milligrams of α-hydroxyaminosolvaleronitrile having the structure:

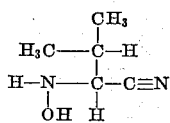

10 milliliters of 98 percent formic acid and 10 milliliters of a mixture containing 29 percent by volume formic acid and 71 percent by volume acetic anhydride are added. The reaction mass is maintained at 25° C. with agitation for one hour. A portion of the resulting solution gives a positive ferric chloride test as described in Example 1, showing the presence of a hydroxamic acid. The resulting solution is then evaporated under reduced pressure, and an oily residue is obtained. Water is added to the oil residue, and crystals of N-formyl-α-hydroxyaminosovaleronitrile form. This compound has the following chemical structure:

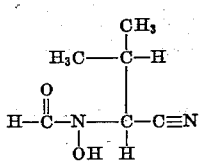

EXAMPLE 5

*N-formyl β-hydroxyamino-β-phenylpropionic acid*

One milliliter of an aqueous solution containing 142 milligrams of the compound produced in Example 1 is acidified with dilute hydrochloric acid to a pH of approximately 2. The resulting solution is stirred for 20 minutes. It is then evaporated to dryness. The resulting solids are extracted with 100 percent ethyl alcohol. The ethyl alcohol slurry is filtered, and the filtrate is evaporated to dryness at about 30–50° C. under reduced pressure to give N-formyl β-hydroxyamino-β-phenylpropionic acid. The dry product has the structure:

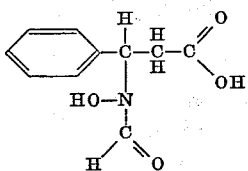

The calcium, potassium, ammonium and magnesium salts of this compound are obtained by treatment of an aqueous solution of this compound with calcium carbonate, potassium hydroxide, aqueous ammonia and magnesium oxide, respectively.

EXAMPLE 6

*N-acetyl β-hydroxyamino-β-phenylpropionic acid*

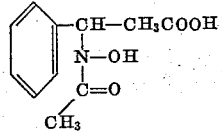

Five grams of β-hydroxyamino-β-phenylpropionic acid are dissolved in about 20 ml. of acetic anhydride, and the solution is allowed to stand for one hour at about 25° C. and is then evaporated to dryness in vacuo. The resulting syrup is dissolved in 50 ml. of water and allowed to stand for three days. The solution is adjusted to about pH 7–8 with dilute sodium hydroxide and is then evaporated in vacuo to obtain a viscous residue, which on mulling crystallizes. The crystalline mass is washed with acetone and dried. The yield of sodium N-acetyl-β-hydroxyamino-β-phenylpropionate is 674 mg. It is recrystallized by dissolving in water (3 ml.) and diluting the resulting solution with acetone (37 ml.).

The infrared absorption spectrum of a substantially pure sample of the sodium N-acetyl-β-hydroxyamino-β-phenylpropionate suspended in mineral oil (Nujol) taken on a Perkin-Elmer Model 137 Infrared Spectrophotometer (Infracord) shows characteristic peaks at the following wavelengths, expressed in microns: 6.2, 7.55, 8.05, 8.15, 8.65, 8.75, 10.2, 10.5, 10.95, 11.7, 12.75, 13.8 and 14.3. The addition of hydrochloric acid to a solution of sodium N-acetyl-β-hydroxyamino-β-phenylpropionate, to a pH of 2 will cause the formation of N-acetyl-β-hydroxyamino-β-phenylpropionic acid.

N-acetyl-β-hydroxyamino-β-phenylpropionic acid is also prepared by dissolving 2 grams of β-hydroxyamino-β-phenylpropionic acid in a mixture of 10 ml. of acetic anhydride and 10 ml. of water and by stirring at about 25° C. for one hour.

EXAMPLE 7

*Sodium N-formyl β-hydroxyamino-β-(o-chlorophenyl)-propionate*

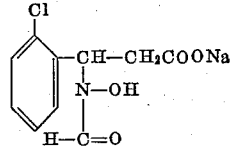

A solution of 50 grams of o-chlorocinnamic acid and about 26 grams of hydroxylamine in 500 ml. of methanol is refluxed for 2 hours. The solution is then allowed to stand at about 25° C. for 17 hours. The crystals of β-hydroxyamino-β-(o-chlorophenyl)-propionic acid which form are separated by filtration, washed with methanol and dried.

1.9 grams of β-hydroxyamino-β-(o-chlorophenyl)-propionic acid is dissolved in a mixture of 10 ml. of 98 percent formic acid and 2 ml. of acetic anhydride. The solution is allowed to stand for 30 minutes at about 25° C. and is then evaporated to dryness in vacuo. 5 ml. of water is added to the residue, and a solution of about pH 7–8 is obtained by the addition of dilute sodium hydroxide. This solution is then diluted with acetone to obtain crystalline sodium N-formyl-β-hydroxyamino-β-(o-chlorophenyl)-propionate. With ferric chloride it gives a typical red-purple color of a hydroxamic acid. The infrared absorption spectrum of a substantially pure sample of the sodium N-formyl-β-hydroxyamino-β-(o-chlorophenyl)-propionate suspended in mineral oil (Nujol) taken on a Perkin-Elmer Model 137 Infrared Spectrophotometer (Infracord) shows characteristic peaks at the following wavelengths, expressed in microns: 6.1, 7.6–7.7, 7.85, 8.25, 8.4, 8.55, 9.3, 9.65, 10.3, 10.45, 10.7, 11.25, 11.6, 12.95, 13.3, 13.8 and 14.5.

EXAMPLE 8

*Sodium N-formyl β-hydroxyamino-β-(p-nitrophenly)-propionate*

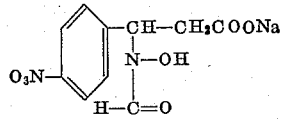

A solution of 10 grams of p-nitrocinnamic acid and about 7 grams of hydroxylamide in 100 ml. of methanol is refluxed for 3 hours. The solution is then allowed to stand at about 25° C. for three days. The crystals of β-hydroxyamino-β-(p-nitrophenly)-propionic acid which form during this time are separated by filtration, washed with water and dried. The compound is then recrystallized by dissolving in dilute sodium hydroxide and neutralization with acetic acid. The crytsals are washed with water and dried.

1.936 grams of the crude β-hydroxyamino-β-(p-nitrophenyl)-propionic acid are dissolved in a mixture of 20 ml. of 98 percent formic acid and 1 ml. of acetic anhydride. The solution is allowed to stand at about 25° C. for about 16 hours. The solution is then concentrated in vacuo to near dryness and then 10 ml. of water is added. While concentrating this solution, crystallization takes place, and solids are obtained. These solids are triturated with acetone, and the acetone solution is diluted with petroleum ether (30–60° C.). The resulting oily precipitate and solution are evaporated in vacuo to give residue. Treatment of the residue with water gives crystalline N-formyl β-(p-nitrophenyl)-propionic acid.

1.24 grams of N-formyl β-hydroxyamino-β-(p-nitrophenyl)-propionic acid are added to 10 ml. of water, and a solution is obtained having a pH of 7–8 by the addition of dilute sodium hydroxide. This solution is diluted with about 30 ml. of mixture of about 20 ml. of acetone and 10 ml. of ethanol. This solution is allowed to stand at about 5° C. for about 16 hours. During this time, sodium N-formyl β - hydroxyamino-β-(p-nitrophenyl)-propionate crystallizes. The salt is separated, washed with ethanol and dried.

EXAMPLE 9

*N-acyl hydroxyamino carboxylic acids and salts*

The sodium salts of the N-acyl hydroxyamino carboxylic acids in Examples 1, 2, 6, 7 and 8 may be converted to N-acyl hydroxamino carboxylic acids by the following process:

An aqueous solution of the monosodium salt of the N-acyl hydroxyamino carboxylic acid is acidified with hydrochloric acid to a pH of approximately 2. The resulting solution is evaporated eo dryness. The resulting solids are extracted into 100 percent ethyl alcohol and filtered from the insoluble sodium chloride. The filtrate is evaporated to dryness at about 30–50° C. under reduced pressure, leaving the desired N-acyl hydroxyamino carboxylic acid.

The calcium, potassium, ammonium and magnesium salts of N-acyl hydroxyamino carboxylic acids may be prepared by addition of stoichiometric quantities of calcium carbonate, potassium hydroxide, aqueous ammonia and magnesium oxide, respectively, to solutions of N-acyl hydroxyamino carboxylic acids.

The dipotassium, diammonium and disodium salts of N-acyl hydroxyamino carboxylic acids may be prepared by addition of stoichiometric quantities of potassium hydroxide, aqueous ammonium and sodium hydroxide, respectively, to solutions of the mono-potassium salts, mono-ammonium salts and monosodium salts of N-acyl hydroxyamino carboxylic acids.

EXAMPLE 10

*N-formyl-α-hydroxyaminohendecanoamide*

To 400 mg. of α-hydroxyaminohendecanoamide having the structure:

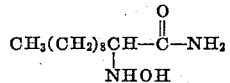

5 ml. of 98 percent formic acid and 0.5 milliliter of acetic anhydride are added. The resulting reaction mass is maintained with agitation at 25° C. for one hour. The resulting solution is then evaporated to dryness under reduced pressure. The resulting residue is triturated with diethyl ether. The residue, on standing under diethyl ether, crystallizes. The resulting slurry is then filtered. The precipitation, N - formyl-α-hydroxyaminohendecanoamide, obtained from the filtration is recrystallized from methyl alcohol. The structure of this compound is as follows:

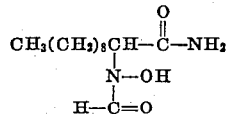

Modifications may be made in carrying out the present invention without departing from the spirit and scope thereof, and I am to be limited only by the appended claims.

What is claimed is:

1. A compound having the structure:

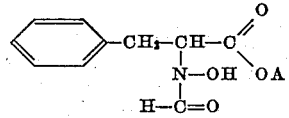

wherein A is selected from the group consisting of hydrogen and alkyl.

2. A compound having the formula

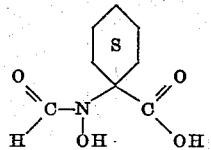

3. N-formyl-1-hydroxyamino cyclopentane - 1 - carboxylic acid.

4. Sodium - N-formyl-1-hydroxyamino cyclopentane-1-carboxylate.

References Cited by the Examiner

Yale, Chem. Reviews, vol. 33, p. 233 (1943).
Houben-Weyl, Methoden der Organischen Chemie, vol. XI/2, p. 28.
Finar, Organic Chemistry, vol, I, p. 185 (1959).
Horning, Organic synthesis, vol. III, p. 813 (1955).
Wagner et al., Synthetic Organic Chemistry, p. 567 (1953).

LORRAINE A. WEINBERGER, *Primary Examiner.*

CHARLES B. PARKER, LEON ZITVER, *Examiners.*

G. P. D'Angelo, D. D. HORWITZ, L. A. THAXTON, *Assistant Examiners.*